United States Patent [19]

Scheuneman et al.

[11] 3,917,933

[45] Nov. 4, 1975

[54] ERROR LOGGING IN LSI MEMORY STORAGE UNITS USING FIFO MEMORY OF LSI SHIFT REGISTERS

[75] Inventors: James H. Scheuneman, St. Paul; John R. Trost, Anoka, both of Minn.

[73] Assignee: Sperry Rand Corporation, New York, N.Y.

[22] Filed: Dec. 17, 1974

[21] Appl. No.: 533,565

[52] U.S. Cl. .................... 235/153 AK; 235/153 AM; 340/172.5

[51] Int. Cl.$^2$ .................... G11C 29/00; G06F 11/00

[58] Field of Search ............. 235/153 AK, 153 AM; 340/172.5, 146.1 A X; 324/73 R

[56] References Cited

UNITED STATES PATENTS

| | | | |
|---|---|---|---|
| 3,222,653 | 12/1965 | Rice | 340/172.5 |
| 3,444,526 | 5/1969 | Fletcher | 340/172.5 |
| 3,633,175 | 1/1972 | Harper | 340/172.5 |
| 3,697,949 | 10/1972 | Carter et al. | 235/153 AM |
| 3,794,819 | 2/1974 | Berding | 235/153 AM |
| 3,803,560 | 4/1974 | DeVoy et al. | 235/153 AK |
| 3,872,291 | 3/1975 | Hunter | 235/153 AK |

*Primary Examiner*—Charles E. Atkinson
*Attorney, Agent, or Firm*—Kenneth T. Grace; Thomas J. Nikolai; Marshall M. Truex

[57] ABSTRACT

A maintenance procedure comprising a method of and an apparatus for storing information identifying the location of one or more defective bits, i.e., a defective memory element, a defective storage device or a failure, in a single-error-correcting semiconductor main storage unit (MSU) comprised of a plurality of replaceable large scale integrated (LSI) bit planes. The method utilizes an error logging store (ELS) that is comprised of a plurality of word-group-associated registers which hold the address data that identifies the replaceable LSI bit planes of the MSU in which a correctable error has been detected. After each detection of a correctable error, the address data is compared to address data already stored in the ELS. If the comparison indicates that it is new address data, i.e., that that bit plane has not previously caused a correctable error, the address data is entered into the ELS, shifting all previous entries one stage. After a predetermined number of defective bit plane addresses, i.e., address data, are stored therein a signal is generated to alert the machine operator to schedule preventive maintenance of the MSU by replacing the defective bit planes. By statistically determining the number of allowable failures, i.e., the number of correctable failures that may occur before the expected occurrence of a non-correctable double bit error, preventive maintenance may be scheduled only as required by the particular MSU.

4 Claims, 6 Drawing Figures

ERROR LOGGING IN LSI MEMORY STORAGE UNITS USING FIFO MEMORY OF LSI SHIFT REGISTERS

BACKGROUND OF THE INVENTION

Semiconductor storage units made by large scale integrated circuit techniques have proven to be cost-effective for certain applications of storing digital information. Most storage units are comprised of a plurality of similar storage devices or bit planes each of which is organized to contain as many storage cells or bits as feasible in order to reduce per bit costs and to also contain addressing, read and write circuits in order to minimize the number of connections to each storage device. In many designs, this has resulted in an optimum storage device or bit plane that is organized as N words of 1 bit each, where N is some power of two, typically, 256, 1,024 or 4,096. Because of the 1 bit organization of the storage device, single bit error correction as described by Hamming in the publication *Error Detecting and Correcting Codes*, R. W. Hamming, The Bell System Journal, Vol. XXVI, April, 1950, No. 2, pp. 147–160, has proven quite effective in allowing partial or complete failure of a single storage cell or bit in a given word, i.e., a single bit error, the word being of a size equal to the word capacity of the storage device, without causing loss of data readout from the storage unit. This increases the effective mean-time-between-failure (MTBF) of the storage unit.

Because the storage devices are quite complex, and because many are used in a semiconductor storage unit, they usually represent the predominant component failure in a storage unit. Consequently, it is common practice to employ some form of single bit error correction along the lines described by Hamming. While single bit error correction allows for tolerance of storage cell failures, as more of them fail the statistical chance of finding two of them, i.e., a double bit error, in the same word increases. Since two failing storage cells in the same word cannot be corrected without relatively complicated logic, it would be desirable to replace all defective storage devices before this occurred, such as at a time when the storage unit would not be in use but assigned to routine preventive maintenance.

While it would be possible to replace each defective storage device shortly after it failed, this normally would not be necessary. It would be more economical to defer replacement until several storage devices were defective thereby achieving a better balance between repair costs and the probability of getting a double failure in a given word. One technique for doing this is to use the central processor to which the storage unit is connected to do this as one of its many other tasks under its normal logic and program control. However, this use of processor time effectively slows down the processor for its intended purpose since time must be allocated to log errors form the storage unit. The effect of this can be better understood when it is noted that a complete failure of a storage device in an often-used section of the storage unit may require a single error to be reported every storage cycle. Since the processor may need several storage cycles to process the error log a great loss of performance would result. One method which has been used to alleviate this is to sample only part of the errors, but this causes lack of logging completeness.

The novel procedure described herein alleviates the above problem by not reporting the same defective device every time it is read out. This procedure also has the advantage that no modifications need to be made to the central processor when a storage unit is replaced with one that uses error correction. This allows, for example, the inclusion of error correction in a storage unit and connection of it to an existing or in-use processor without any changes to the processor at installation time.

SUMMARY OF THE INVENTION

The present invention utilizes an error logging store (ELS) that is comprised of a word group address buffer (WGAB), and a bit plane address buffer (BPAB), each of which is comprised of 16 word-group-associated address registers and syndrome registers, respectively. Each address register in the WGAB stores a single tag bit that when Set signifies that a defective bit has been determined to be in the one associated word group, and a group of 7 bits, i.e., the word group address, that identifies the one of the 16 word groups in which the defective bit lies. Each syndrome register in the BPAB stores a group of 6 bits, i.e., the bit plane address or syndrome bits that identifies the one of the 45 bit planes of the one associated word group that contains the defective bit.

Upon the detection of a correctable error, the word group address and the bit plane address are simultaneously entered into a word group address register (WGAR) and a bit plane address register (BPAR) of their associated word group address buffer (WGAB) and bit plane address buffer (BPAB), respectively, with the tag bit being Set to a 1. Upon the detection of each correctable error, the WGAB is searched for a match, i.e., that a correctable error has been previously found in the same word group and stored in the WGAB. If no match is found then the contents of the WGAB and BPAB are shifted in parallel one address register and one syndrome register, respectively, and the latest word group address and bit plane address are entered into the first address register and the first syndrome register, respectively. This logging procedure continues until the allowable number of correctable failures is reached at which time a signal is generated that alerts the machine operator preventive maintenance should be scheduled for the MSU.

DESCRIPTION OF THE PREFERRED EMBODIMENT

Figure 1:
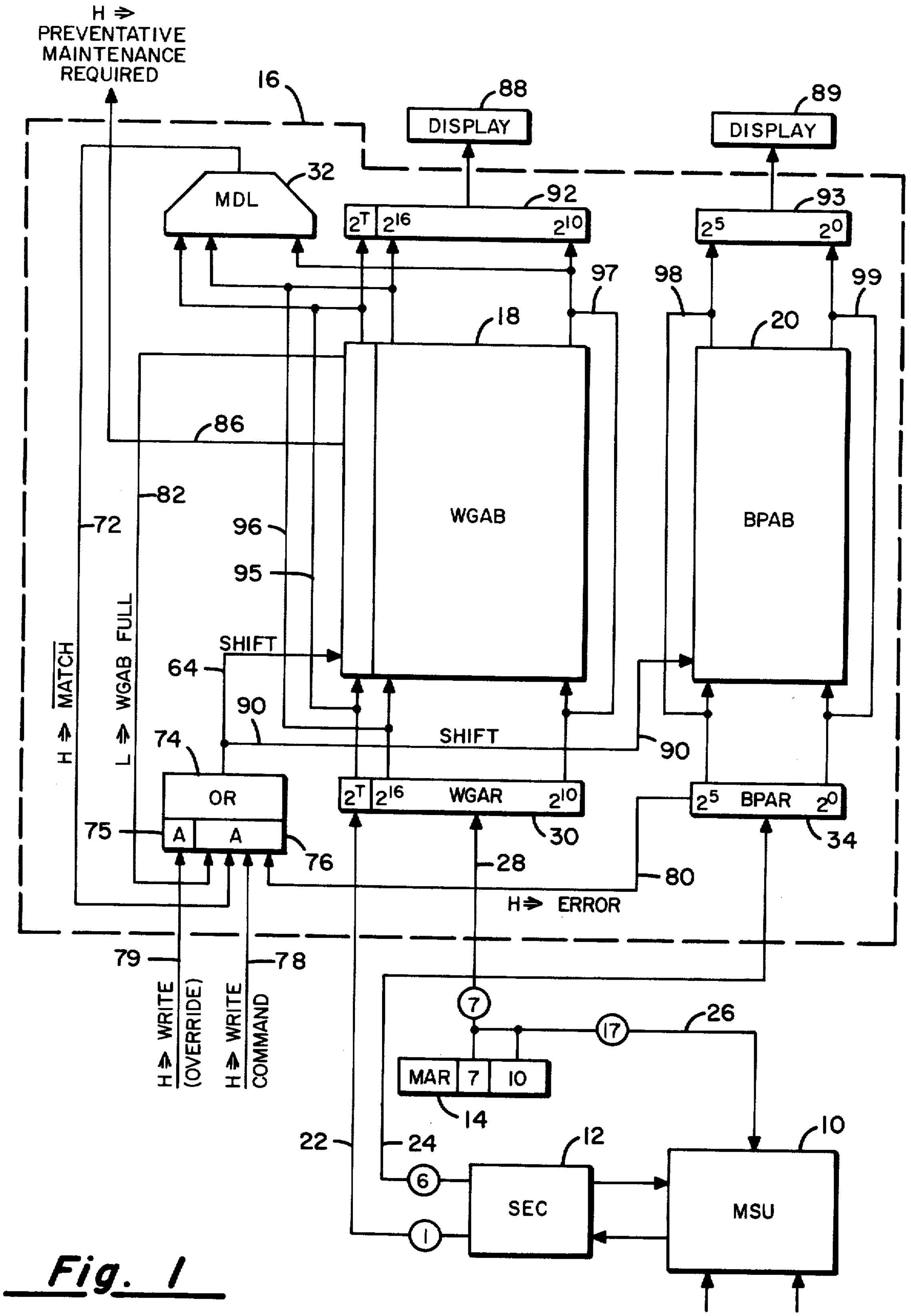
FIG. 1 is a block diagram of a memory system incorporating the present invention.

With particular reference to FIG. 1 there is illustrated a memory system incorporating the present invention. The Main Storage Unit (MSU) 10 is of a well-known design configured according to FIG. 2. MSU 10 is an LSI semiconductor memory having 131K words each of 45 bits in length containing 38 data bits and 7 check bits. MSU 10 is organized into 128 word groups each word group having 45 bit planes, each bit plane being a large scale integrated (LSI) plane of 1,024 bits or memory location. The like-ordered bit planes of each of the 128 word groups are also configured into 45 bit plane groups, each of 128 bit planes. Addressing of the MSU 10 is by concurrently selecting one out of the 128 word groups and one like-ordered bit out of the 1,024 bits of each of the 45 bit planes in the one selected word group. This causes the simultaneous readout, i.e., in parallel, of the 45 like-ordered bits that constitute the one selected or addressed word.

Figure 3:
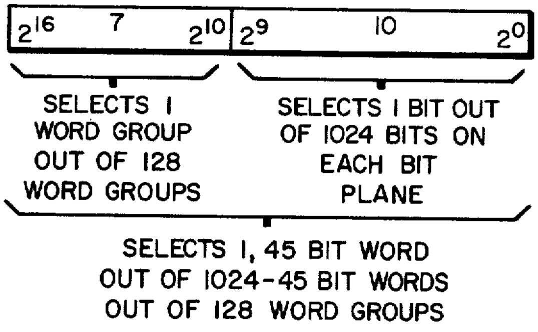
FIG. 3 is an illustration of the format of an address word that is utilized to address a word in the MSU of FIG. 1.

With particular reference to FIG. 3 there is illustrated the format of an address word that is utilized to select or address one word out of the 131K words that are stored in MSU 10. In this configuration of the address word, the higher-ordered 7 bits, $2^{16}-2^{10}$, according to the 1's or 0's in the respective bit locations $2^{16}-2^{10}$, select or address one word group out of the 128 word groups while the lower-ordered 10 bits, $2^9-2^0$, select or address one bit of the 1,024 bits on each of the 45 bit planes in the word group selected by the higher-ordered bits $2^{16}-2^{10}$.

MSU 10 utilizes a single error correction circuit (SEC) 12 — see the hereinabove cited publication of Hamming — for the determination and correction of single bit errors in each of the 45 bit words stored therein. Also illustrated is a memory address register (MAR) 14, such as that discussed above with particular reference to FIG. 3, for addressing or selecting one out of the 131K 45 bit words stored in MSU 10.

Figure 2:
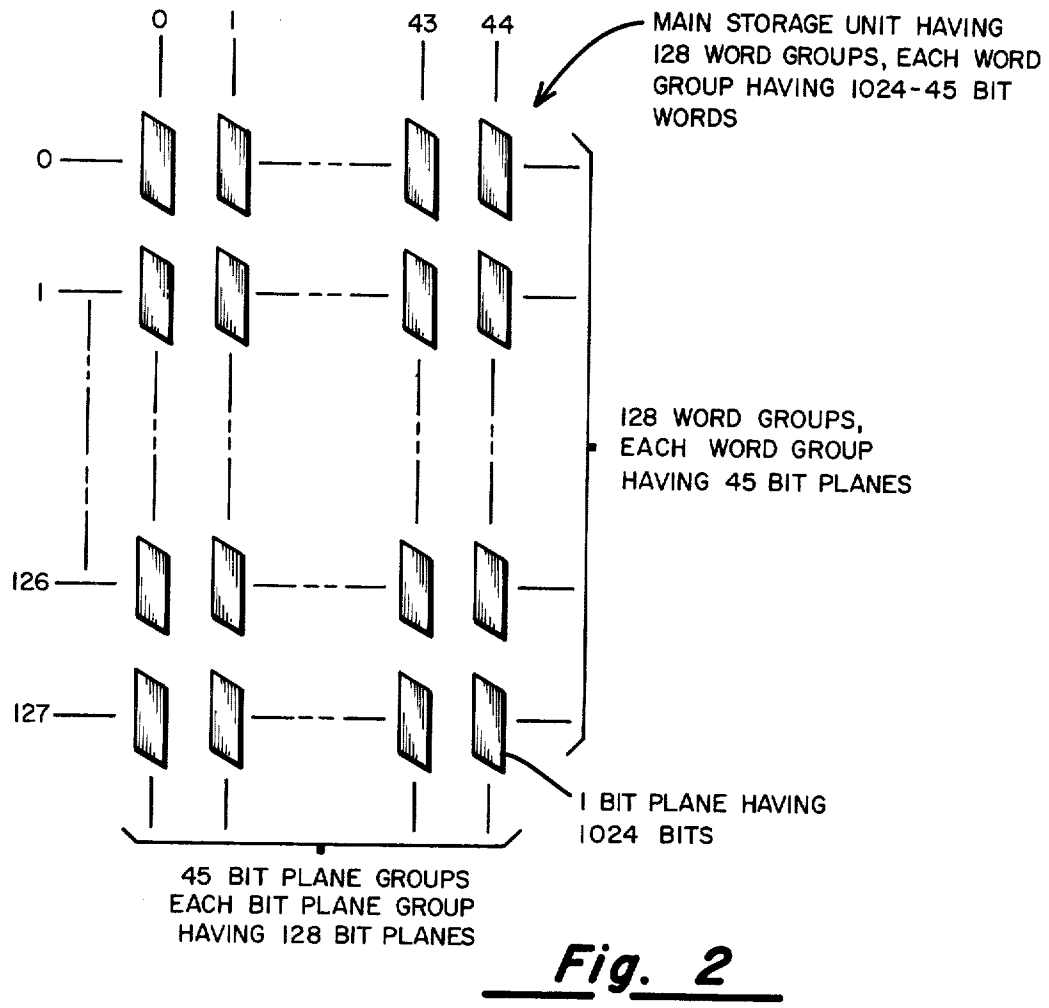
FIG. 2 is an illustration of how the replaceable 1,024 bit planes are configured in the MSU of FIG. 1.

SEC 12 while correcting any single error in the one word addressed in MSU 10 also generates two other signals: a tag bit, a 1 bit denoting an error condition or a 0 bit denoting no error condition; and 6 syndrome bits that identify the 1 bit plane group that contains the defective bit out of the 45 bit plane groups in which MSU 10 is configured as previously discussed with particular reference to FIG. 2. The 1 tag bit and the 6 syndrome bits generated by SEC 12 are as illustrated in FIG. 4.

In accordance with the present invention there is provided an error logging store (ELS) 16 that is comprised of a word group address buffer (WGAB) 18 and a bit plane address buffer (BPAB) 20 each being comprised of 16 word-group-associated address registers and syndrome registers, respectively. Each address register in WGAB 18 is comprised of eight stages or flip-flops (FFs): a FF for holding the tag bit $2^T$ that when Set to hold a 1 signifies that a defective bit has been determined to be in the one associated word group and a group of seven FFs for holding the word group address, bits $2^{16}-2^{10}$, — see FIG. 3, that identifies the one of the 128 word groups in which the defective bit lies. Each syndrome register in BPAB 20 is comprised of six stages or FFs for holding the bit plane group address, bits $2^5-2^0$, — see FIG. 4, that identifies the one of the 45 bit planes of the one associated word group that contains the defective bit.

MSU 10, SEC 12 and MAR 14 operate to form a memory system that employs single error correction, i.e., any one bit in any one of the 131K 45-bit words if defective is correctable by SEC 12 permitting the associated data processing system to function as if no error had been detected; however, two or more errors, i.e., two or more bits in any one word being defective, are non-correctable by SEC 12 requiring the associated data processing system to institute other error correcting procedures, e.g., to reload the erroneous data word back into MSU 10 from another source. In the present invention, ELS 16 is utilized to record what bit plane out of the 128 × 45 bit planes the correctable single error was detected and corrected. That is, whenever a correctable single error is detected upon the readout of a word stored in MSU 10, SEC 12 operates to correct that error and to generate on line 22 a single tag bit and on lines 24 6 syndrome bits, per FIG. 4, that identify what one bit plane, containing 1,024 bits, out of the 128 × 45 bit planes in MSU 10 the error was detected.

Figure 4:
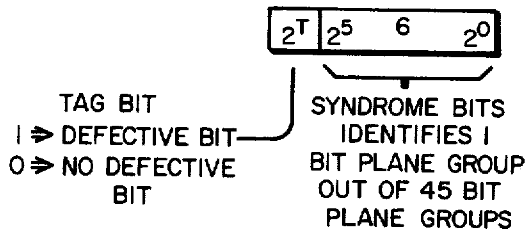
FIG. 4 is an illustration of the format of the tag bit and the syndrome bits that are stored in the ELS of FIG. 1.

MAR 14 by means of its 7 higher-ordered bits $2^{16}-2^{10}$ selects or addresses one of the 128 word groups in MSU 10 and by means of its 10 lower-ordered bits $2^9-2^0$ selects or addresses one bit in each of the 45 bit planes in the one selected word group, per FIG. 3, while the 6 syndrome bits, $2^5-2^0$, per FIG. 4, that are generated by SEC 12 identify the one bit plane in which the correctable single error was detected by SEC 12. As an example, assume that SEC 12 detects that a single error has occurred upon the readout of the 45 bit word from MSU 10 as addressed by MAR 14 via line 26. If MAR 14 contains the multibit word group address in the higher-ordered bit positions $2^{16}-2^{10}$ of FIG. 3, e.g., 0 0 0 0 0 1 0 the higher-ordered bits $2^{16}-2^{10}$ are transferred to WGAR 30 via line 28. Then, SEC 12, via line 22, couples a 1 representing the signal tag bit $2^T$ to tag bit position $2^T$ of WGAR 30 indicating that a correctable error has been detected in word group 2 of MSU 10 (see FIG. 2) — and couples the 6 syndrome bits $2^5-2^0$ of FIG. 4, e.g., 1 0 0 1 0 1 to the syndrome bit positions $2^5-2^0$ of BPGR 32 indicating that a correctable error has occurred in bit plane, e.g., 37 (of word group 2). In general then, each time a single error occurs, the higher-ordered 7 address bits $2^{16}-2^{10}$ that are used to address the one word group out of the 128 word groups that make up MSU 10 would be coupled to the corresponding bit positions or stages $2^{16}-2^{10}$ of WGAR 30, the single tag bit $2^T$ would be coupled to the corresponding bit position or stage $2^T$ of WGAR 30 and the 6 syndrome bits $2^5-2^0$ would be coupled to the corresponding bit positions or stages $2^5-2^0$ of BPAR 34.

Figure 5:
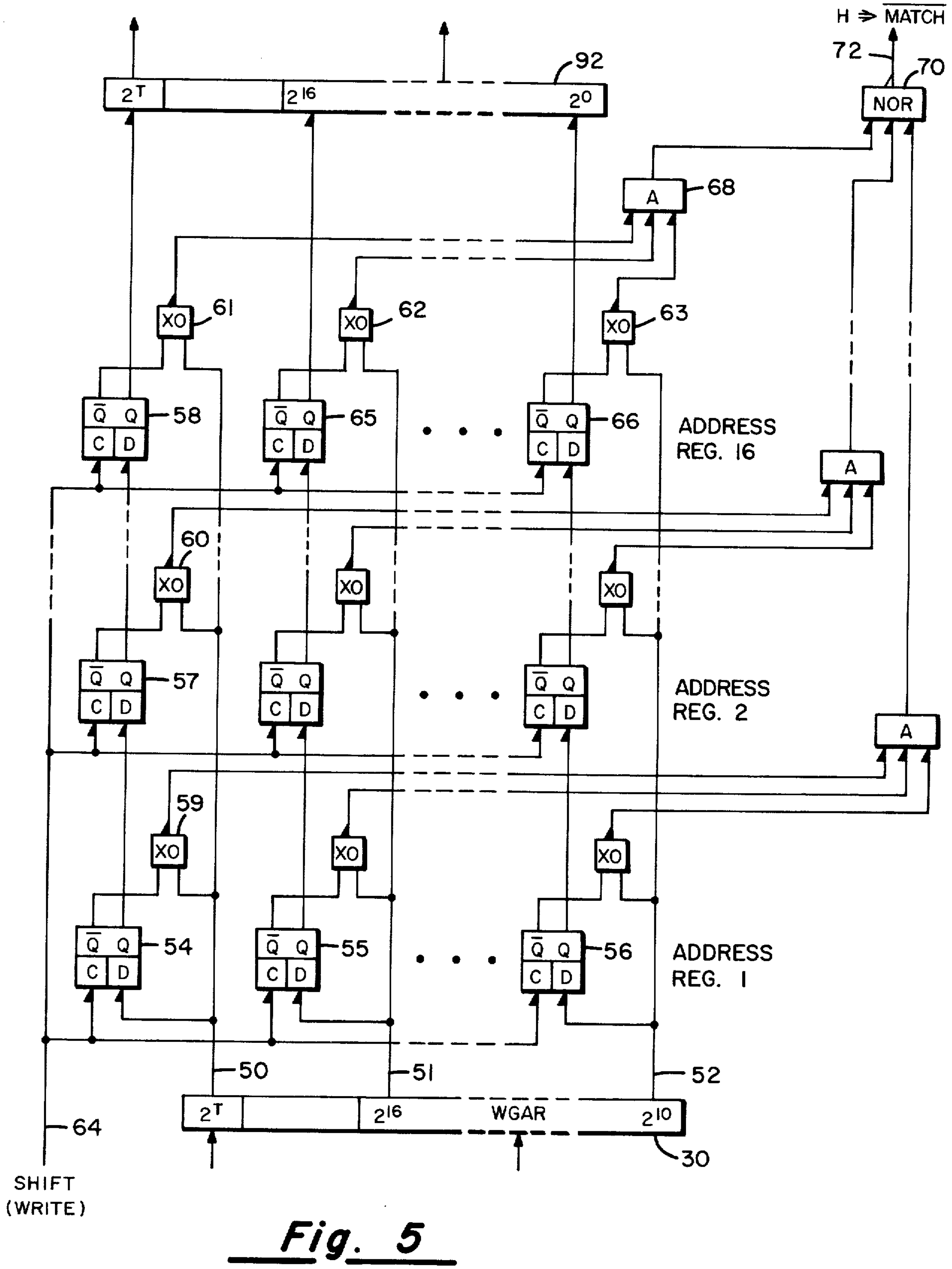
FIG. 5 is a logic diagram of the word group address buffer of FIG. 1.

With particular reference to FIG. 5 there is illustrated a logic diagram of the word group address buffer (WGAB) 18 of FIG. 1. WGAB 18 is comprised of eight shift registers the 16 stages of each of which are aligned in a vertically oriented direction the stages of which constitute the like-ordered stages of the 16 address registers of WGAB 18. As an example, address register 1 is comprised of the ordered registers or stages $2^T$, $2^{16}-2^{10}$ as identified by the associated stages of WGAR 30. With the tag bit $2^T$ and the word group address bits $2^{16}-2^{10}$ loaded into WGAR 30 as discussed above upon the detection of a correctable error by SEC 12, such bits by their associated lines 50, 51, 52 are coupled in parallel to the Data (D) inputs of the associated flip-flops (FFs) 54, 55, 56 of address register 1 and in parallel to the Exclusive ORS (XORs) associated with each stage of the associated shift register, i.e., tag bit $2^T$ of stage $2^T$ of WGAR 30 via line 50 is coupled in parallel as inputs to XORs 59, 60, 61 that are associated with FFs 54, 57, 58, respectively, of address register 1, address register 2 and address register 16, respectively.

With the Shift (Write) signal on line 64 held L⇒⊣, the L-Clock (C) signal at the C-inputs to the FFs of WGAB 18, the tag bit $2^T$ and the word group address bits $2^{16}$ – $2^{10}$ held in WGAR 30 are not enabled to be entered into the first address register, address register 1, while concurrently information as stored in the respective vertically oriented shift registers is not shifted one bit position vertically upwardly. However, at this time the XORs from the Clear ($\bar{Q}$) outputs of each respectively associated stage of address register 1 through address register 16 determine whether or not there is a match between the associated address data bits on lines 50, 51, 52 and the associated stages of address registers 1 through address register 16. That is, with respect to address register 16, XORs 61, 62, 63 determine whether there is a match between their individually associated tag bit $2^T$ and word group address bits $2^{16}$ – $2^{10}$ and the contents of the associated FFs 58, 65, 66, respectively, of address register 16. If all the Xors associated with the FFs of a single address register indicate a match condition whereby the tag bit $2^T$ and the word group address bits $2^{16}$ – $2^{10}$ in one address register are identical to the tag bit $2^T$ and the word group address bits $2^{16}$ – $2^{10}$ held in WGAR 30, the H⇒⊣outputs therefrom at the respectively associated Match AND gate couple the corresponding H⇒⊣to Match NOR 70. If any one of the Match AND gates couples a H⇒⊣signal to Match NOR 70 it couples a L⇒⊣Match signal to line 72 (note that in FIG. 1 this Match detection logic of FIG. 5 is represented by MDL 32) indicating that the word group address presently held in WGAR 30 has previously been stored in one of the address registers of WGAB 18. This L Match signal on line 72 disables AND/OR 74 via AND 76 preventing H⇒⊣⇒Shift (Write) signals from being coupled to WGAB 18 and BPAB 20 via lines 64 and 90, respectively. As an example, if the bits held in FFs 58, 65, 66 of address register 16 are identical to the corresponding bits presently held in WGAR 30 the associated XORs 61, 62, 63 couple H⇒⊣signals to AND 68 and thence a corresponding H⇒⊣signal to NOR 70.

If, alternatively, a search of address registers 1 through 16 indicate that the bits held in WGAR 30 do not correspond to a word group address stored therein, NOR 70 couples a H⇒⊣⇒$\overline{\text{Match}}$ or Miss signal to line 72 enabling AND/OR 74. Subsequently, the associated data processing system initiates a H⇒Write Command signal on line 78. AND 76 of AND/OR 74 is then enabled by the concurrent H⇒⊣signals of lines 72, 78, 80, 82 and couples a Shift (Write) H⇒⊣signal on line 64 such that all the FFs of WGAB 18 are clocked, entering or loading, the new data therein. As an example, when Shift line 64 goes H⇒⊣the Set outputs (Q) of the FFs of each address register being coupled to the Data input of the next subsequent FF of the next higher-ordered address register, the bits from the FF of the next lower-ordered address register are shifted into the like-ordered FF of the next higher-ordered address register in parallel throughout WGAB 18 while concurrently via lines 50, 51, 52 the tag bit $2^T$ and the word group address bits $2^{16}$ – $2^{10}$ held in WGAR 30 are entered into the corresponding FFs 54, 55, 56 of address register 1. Alternatively, as discussed above, if after a comparison of the tag bit $2^T$ and the word group address bits $2^{16}$ – $2^{10}$ stored in WGAR 30 indicates that there was a Match condition determined NOR 70 would not have coupled a H⇒⊣Match signal but a L⇒⊣⇒$\overline{\text{Match}}$ signal to line 72, and, accordingly, no change of status of WGAB 18 would have been effected.

Figure 6:
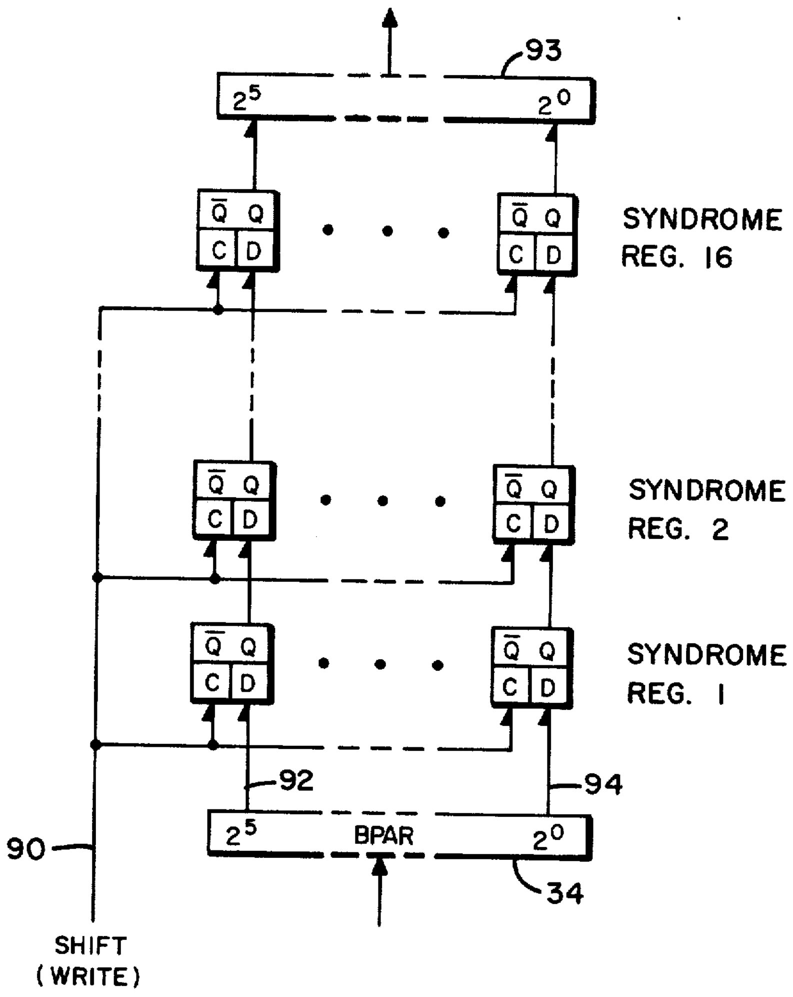
FIG. 6 is a logic diagram of the bit plane address buffer of FIG. 1.

With particular reference to FIG. 6 there is presented a logic diagram of BPAB 20 of FIG. 1. BPAB 20 of FIG. 6 is configured in a manner similar to that of WGAB 18 of FIG. 5 in that it is constructed of a plurality of, i.e., six, shift registers each of 16 stages in length aligned in a vertically oriented direction, the like-ordered stages of which form the like-ordered stages of syndrome register 1 through syndrome register 16. When the syndrome bits $2^5$ – $2^0$ have been entered in BPAR 34 in the manner described above and the match logic of WGAB 18 of FIG. 6 has determined that there was no Match of the tag bit $2^T$ and the word group address bit $2^{16}$ – $2^{10}$ held in word group address register 36, Shift (Write) line 90 is held H⇒⊣enabling the information coupled at the Data inputs of the respectively associated stages of syndrome register 1 through syndrome register 16 to be shifted upwardly into their next adjacent like-ordered stage of the next adjacent syndrome register while concurrently syndrome bits $2^5$ – $2^0$ held in BPAR register 34 are entered into the respectively associated FFs of syndrome register 1 via their associated lines 92, 94. In a manner similar to that of WGAB 18, if a L⇒⊣⇒$\overline{\text{Match}}$ signal is coupled to line 74, AND/OR 76 is disabled coupling a L⇒⊣signal to Shift (Write) line 90 and no change of status of BPAB 20 would have been effected.

With reference back to FIG. 1, assume that during a read operation SEC 12 determines that a single error has been detected in the one word read out of MSU 10. With MAR 14 containing the address data of the word in which the single error has been detected, MAR 14 couples the higher-ordered 7 bits to $2^{16}$ – $2^{10}$ thereof to WGAR 30 via line 28. Additionally, SEC 12, via line 22, couples a 1 representing the single tag bit $2^T$ to tag bit position $2^T$ of WGAR 30 indicating that a correctable error has been detected in the so-addressed word, and couples the 6 syndrome bits $2^5$ – $2^0$ to BPAR 34 via line 36. This loading of the BPAR 34 with the syndrome bits $2^5$ – $2^0$ also generates on line 80 a H⇒Error signal that is, in turn, coupled to AND 76 of AND/OR 74. Assuming further that the tag bit $2^T$ and the word group address bits $2^{16}$ – $2^{10}$ that are presently loaded into WGAR 30 previously have not been loaded into WGAB 18, MDL 32 generates a H⇒Match signal on line 72 and with line 82 normally coupling a H⇒⊣to AND 76, a H⇒⊣Write Command signal on line 78 enables AND 76 causing AND/OR 74 to couple a H⇒Shift (Write) signal to WGAB 18 and to BPAB 20 via line 64 and line 90, respectively. This then causes the tag bit $2^T$ and the word group address bits $2^{16}$ – $2^{10}$ held in WGAR 30 and the syndrome bits $2^5$ – $2^0$ held in BPAR 34 to be shifted, in parallel, into address register 1 of WGAB 18 and syndrome register 1 of BPAB 20 while, concurrently, the tag bits, the address bits and the syndrome bits previously stored in WGAB 18 and BPAB 20 are shifted through their associated shift registers one bit position.

This procedure continues until the tag bit $2^T$ of the first entered word group address bits is shifted into an address register, e.g., address register 12, in WGAB 18 from which an associated line 86 detects the tag bit $2^T$ coupling a H⇒Preventive Maintenance Required signal thereon. This Preventive Maintenance Required signal from line 86 indicates to the machine operator that the allowable number of single errors has been logged in ELS 16 and that preventive maintenance upon MSU 10 should now be scheduled. This loading of WGAB 18 and BPAB 20 of ELS 16 continues until address register 16 and syndrome register 16 thereof are filled at which time a L⇒WGAB Full signal on line 82 is coupled to AND 76, which L⇒4 signal disables AND 76 preventing AND 76 from enabling AND/OR 74 to couple a H⇒Shift (Write) signal on lines 64 and 90 precluding new information from WGAR 30 and BPAR 34 to be entered into WGAB 18 and BPAB 20.

To read out the information stored in ELS 16, a H⇒Write (Override) signal is coupled to AND 75 via line 79. This H⇒Write (Override) signal on line 78 enables AND/OR 74 to couple a H⇒Shift (Write) signal to lines 64 and 90 causing the contents of address register 16 of WGAB 18 and of syndrome register 16 of BPAB 20 to be shifted into holding registers 92, 93 the contents of which are displayed by means of Displays 88, 89, respectively, for machine operator determination of the one associated bit plane that included the single error and which is to be replaced during normal preventive maintenance procedures. This shifting of the information stored in the shift registers of WGAB 18 and BPAB 20 out into the associated holding registers 92 and 93, respectively, would normally effect a master clear of the shift registers of WGAB 18 and BPAB 20; however, if it is desired that such information be retained therein, recirculating feedback to the first address register and the first syndrome register of WGAB 18 and BPAB 20 may be effected by the recirculating feedback lines 95, 96, 97 and 98, 99 of WGAB 18 and BPAB 20, respectively.

The primary purpose for error correction in a semiconductor memory, such as MSU 10, is to allow a permissible tolerance of failing semiconductor storage devices or bits. Further, the primary purpose of error logging in ELS 16 is to indicate when the number of defective devices, i.e., single errors, increases to that point that a non-correctable double error may occur such that preventive maintenance may be performed on a semiconductor memory (MSU) prior to the time such non-correctable double error may be expected (statistically) to occur. In the embodiment of FIG. 1, the error logging in ELS 16 provides information to the machine operator, by means of line 86 and Display 88 and Display 89, the number of correctable (single) errors that have occurred since the last preventive maintenance and the specific locations of those correctable errors at the level of replaceable components as defined by the 1 bit plane within the 1 word group. Thus, the method of error logging as exemplified by FIG. 1 permits the machine operator to continuously monitor the number of correctable errors that has been detected, to determine in what replaceable component such as the replacement LSI bit plane of 1,024 bits, in which the correctable errors occurred and to schedule preventive maintenance prior to the expected occurrence of non-correctable double errors within MSU 10.

Because single error correction, double error detection schemes are receiving wide use in semiconductor storage units made up of large scale integrated circuit bit planes, each of which bit planes is considered a replaceable item upon normal preventive maintenance procedures, it is desirable that error logging stores be utilized to provide the optimum operation of the semiconductor storage units to ensure a maximum mean-time-between-failure. Thus, because the error logging store is an item additional to the normal requirements of a semiconductor storage unit it is essential that the cost of such error logging store be held to a minimum to permit maximum use of known error correction techniques. Applicants' invention, in the use of an error logging store that is comprised of a plurality of LSI shift registers has been determined to provide a substantial saving over prior error logging stores using content addressable memories (CAM) and/or word addressable memories (WAM). The present invention, by using relatively inexpensive shift registers and match logic for its error logging store provides an error logging store of minimum cost with maximum flexibility while performing the essential functions of ensuring the prevention of non-correctable errors within an LSI memory storage unit.

What is claimed is:

1. In a data processing system that includes an LSI semiconductor memory system that is configured into M word groups of N bit planes per word group and B bits per bit plane, each bit plane being a replaceable component upon the detection of a single defective device or bit therein that provides a correctable error upon readout and single error correction circuitry coupled to said memory system for generating upon the detection of each correctable error in said memory system an error word that is associated with only the one of the N bit planes of the one of the M word groups in which the correctable error is detected, said error word comprising a single tag bit $2^T$ and S syndrome bits, said tag bit indicating that a correctable error has occurred in said one of the M word groups in the one of the N bit planes that is identified by said S syndrome bits, and a memory address register for addressing said LSI semiconductor memory system and holding the W ordered bits that address the one selected word group and the X ordered bits that address the one selected bit on each bit plane in the one selected word group, the improvement comprising:

a word group address buffer comprised of 1 + W shift registers, each of Y ordered stages in length, the like-ordered stages of said 1 + W shift registers arranged to form Y address registers each of 1 + W stages in length;

a bit plane address buffer comprised of S shift registers, each of Y ordered stages in length, the like-ordered stages of said S shift registers arranged to form Y syndrome registers, each of S stages in length;

a word group address register of 1 + W ordered stages for receiving the W ordered bits of said word group address from said memory address register and coupling each ordered bit of said word group address to the like-ordered one of said W shift registers of said word group address buffer, and for receiving said tag bit $2^T$ from said single error correcting circuitry and coupling said tag bit to said 1 shift register of said word group address buffer;

a bit plane address register of S ordered stages for receiving the S ordered bits of said syndrome bits from said single error correction circuitry and coupling each ordered bit of said S syndrome bits to the like-ordered one of said S shift registers of said bit plane address buffer;

comparator means for comparing the tag bit and the word group address stored in each of said Y address registers of said word group address buffer to the tag bit and to the word group address stored in said word group address register and generating a miss signal only if no match is found;

means coupled to said comparator means for shifting the contents of each of the Y address registers of said word group address buffer and the contents of each of the S syndrome registers of said bit plane address buffer one stage and loading the contents of said word group address register into the first address register of said word group address buffer and the contents of said bit plane address register into the first syndrome register of said bit plane address buffer when activated by said miss signal;

means coupled to the 1 shift register stage of one of the Y address registers of said word group address buffer for monitoring the tag bit stored therein and alerting the machine operator that preventive maintenance should be scheduled.

2. The improvement of claim 1 in which:

M=128
N=45
B=1,024
S=6
W=7
X=10
Y=16.

3. In a data processing system that includes an LSI semiconductor memory system that is configured into a plurality of word groups each having a plurality of bit planes and a plurality of bits per bit plane, each bit plane being a replaceable component upon the detection of a single defective device or bit therein that provides a correctable error upon readout and single error correction circuitry coupled to said memory system for generating upon the detection of each correctable error in said memory system an error word that is associated with one of the bit planes in which the correctable error is detected, said error word comprising a single tag bit $2^T$ and a plurality of syndrome bits, said tag bit indicating that a correctable error has occurred in the one of the bit planes that is identified by said plurality of syndrome bits, and a memory address register for addressing said LSI semiconductor memory system and holding the ordered bits that address the one selected word group and the ordered bits that address the one selected bit on each bit plane in the one selected word. group, the improvement comprising:

a word group address buffer comprised of a plurality of registers, the like-ordered stages of said shift registers arranged to form a plurality of address registers;

a bit plane address buffer comprised of a plurality of shift registers, the like-ordered stages of said shift registers arranged to form a plurality of syndrome registers;

a word group address register having a plurality of ordered stages for receiving the ordered bits of said word group address from said memory address register and coupling each ordered bit of said word group address to the like-ordered shift register of said word group address buffer, and for receiving said tag bit $2^T$ from said single error correcting circuitry and coupling said tag bit to the like-ordered shift register of said word group address buffer;

a bit plane address register having a plurality of ordered stages for receiving the ordered bits of said syndrome bits from said single error correction circuitry and coupling each ordered bit of said syndrome bits to the like-ordered shift register of said bit plane address buffer;

comparator means for comparing the tag bit and the word group address bits stored in each of said address registers of said word group address buffer to the tag bit and the word group address bits stored in said word group address register and generating a miss signal only if no match is found;

means coupled to said comparator means for shifting the contents of the address registers of said word group address buffer and the contents of the syndrome registers of said bit plane address buffer one stage and loading the contents of said word group address register into the first address register of said word group address buffer and the contents of said bit plane address register into the first syndrome register of said bit plane address buffer when activated by said miss signal;

means coupled to the tag bit holding stage of one of the memory address registers of said word group address buffer for monitoring the tag bit stored therein and alerting the machine operator that preventive maintenance should be scheduled.

4. The improvement of claim 3 further including means coupled to the tag bit holding stage of the last memory address register of said word group address buffer for monitoring the tag bit stored therein and inhibiting said comparator means from shifting the contents of the address registers of said word group address buffer and the contents of syndrome registers of said bit plane address register when activated by said miss signal.

* * * * *